United States Patent [19]

Bogan et al.

[11] Patent Number: 5,106,412
[45] Date of Patent: Apr. 21, 1992

[54] METHOD FOR PROVIDING STEEL WITH LOWERED HYDROGEN LEVEL AFTER LADLE TREATMENT

[75] Inventors: Robert S. Bogan, Harrison Township, Allegheny County, Pa.; Keith E. Sessions, Homewood, Ala.; William J. Stolnacker, deceased, late of South Strabane Township, Washington County, Pa., by Karlene L. Stolnacker, Executrix

[73] Assignee: USX Corporation, Pittsburgh, Pa.

[21] Appl. No.: 694,615

[22] Filed: May 2, 1991

[51] Int. Cl.⁵ ............................................. C21C 5/36
[52] U.S. Cl. .......................................... 75/570; 75/305; 106/38.27; 164/464; 164/473
[58] Field of Search ............... 75/305, 570; 164/473, 164/464; 106/38.27

[56] References Cited

U.S. PATENT DOCUMENTS 4,373,949 2/1983 Spruell et al. .
4,417,924 11/1983 Schwer .
4,795,491 1/1989 Quigley .
5,028,257 7/1991 Tomkins et al. ...................... 75/305

FOREIGN PATENT DOCUMENTS 52-99915 8/1977 Japan .

Primary Examiner—Melvyn J. Andrews
Attorney, Agent, or Firm—W. F. Riesmeyer, III

[57] ABSTRACT

A method is provided for obtaining steel with lowered hydrogen levels after ladle treatment. The method includes covering molten steel in the ladle with a particulate mixture consisting essentially of calcium aluminate and dolomitic limestone. The mixture is used in amounts of about 5 to 25 pounds per net ton of molten steel. Using the method of this invention, some steels to be cast without vacuum degassing to reduce the hydrogen level.

3 Claims, No Drawings

METHOD FOR PROVIDING STEEL WITH LOWERED HYDROGEN LEVEL AFTER LADLE TREATMENT

BACKGROUND OF THE INVENTION

This invention relates to a method for providing steel with lowered hydrogen levels after ladle treatment. Specifically, the method involves covering molten steel in the ladle with a mixture which includes calcium aluminate and dolomitic limestone.

Various synthetic slags have been used to cover molten steel in the ladle to prevent heat loss and to increase sulfur removal during ladle treatment U.S. Pat. No. 4,795,491, Quigley, discloses a premelted synthetic slag for desulfurizing molten steel in the ladle. The premelted slags are obtained as the by-product from production of vanadium and ferrovanadium. They contain calcium aluminate and 9%–20% magnesium oxide. The reference cites as an advantage that magnesium oxide is less likely to absorb water of hydration than calcium oxide. Improved ladle processing is said to be expected from the avoidance of water in the ladle process. This reference does not suggest the use of dolomitic limestone in the synthetic slag composition. U.S. Pat. No. 4,417,924, Schwer, discloses a steelmaking additive for flux solubilization, desulfurization and/or the removal of inclusions. The additive may be added to the ladle in amounts of from 5 to 20 lbs. per ton of steel and contains 20% to 50% lime and 75% to 50% calcium aluminate. Dolomitic lime may be used containing about 58% CaO and 42% MgO. The lime may be in either calcined or hydrated form. The reference does not suggest the use of dolomitic limestone in the additive compositions. This reference also teaches that the additive should not contain any spar so as to avoid shortening ladle lining life.

Finally, an abstract of JP52099915, Nippon Steel Corporation, discloses a flux for reducing hydrogen pick-up for molten steel refining in the furnace or for ladle refining. The flux is made from quick lime reacted at high temperature with carbon dioxide gas to form 2% to 30% $CaCO_3$. This component is then blended with a CaO—$SiO_2$ system. For deoxidation of the steel, alumina is added in place of $SiO_2$ in the ratio of CaO/$Al_2O_3$ of 1 to 3. To lower the melting point of the flux, up to 20% of $CaF_2$ may be added or a few percent of an oxide or carbonate of an alkali metal. This reference does not suggest a flux with calcium aluminate, nor one with magnesium oxide or dolomitic limestone. Another reference of interest is U.S. Pat. No. 4,373,949, Spruell, et al., disclosing the use of higher than normal amounts of dolomitic lime in a top blown oxygen steelmaking vessel.

SUMMARY OF THE INVENTION

According to this invention, a method is provided for making steel with lowered hydrogen levels. The method includes covering molten steel in the ladle with an aggregate of particles in an amount of from about 5 to about 25 lbs. per net ton of molten steel, said aggregate consisting essentially of from about 15% to about 65% dolomitic limestone, from about 35% to about 85% calcium aluminate, and up to about 40% burned lime; and casting the molten steel into a solidified shape without vacuum degassing.

DESCRIPTION OF THE PREFERRED EMBODIMENT

In the method of this invention, we cover molten steel in the ladle with an aggregate of particles. The aggregate of particulates includes in percent by weight from about 15% to about 65% dolomitic limestone, from about 35% to about 85% calcium aluminate and optionally up to about 40% burned lime. Preferably, the ranges of these materials are from about 15% to about 25% dolomitic limestone, from about 35% to about 65% calcium aluminate, and from about 20% to about 40% burned lime.

Typically, the dolomitic limestone we use contains about 85% $CaCO_3$ and about 15% MgO. We have used two calcium aluminate compositions, one containing 50% $Al_2O_3$ and 50% CaO, the other having 65% $Al_2O_3$ and 35% CaO. The first mentioned composition is the most preferred. We use burned lime containing about 95% CaO.

The particle sizes of the materials we use are: for the burned lime and dolomitic limestone, 1 inch and under; for the calcium aluminate, about 1 inch and smaller. We add from about 5 to about 25 lbs. of the aggregate per net ton of molten steel in the ladle. Preferably the amount of aggregate added is from about 10 to about 20 lbs. per net ton of steel.

Although the invention is applicable to all steelmaking practices, it is especially useful in preventing hydrogen pick-up while molten steel is being treated in a ladle metallurgy facility. Due to the extended ladle treatment times, synthetic slag coverings are generally used to reduce heat loss and to serve as a solute for inclusions being removed from the steel. However, the flux materials can serve as a source of moisture and result in hydrogen pick-up in the steel. For steels made in the electric arc furnace or in a Q-BOP vessel which have somewhat higher hydrogen levels to begin with, any additional pick-up is especially harmful. To counteract this problem, some grades of steel have been vacuum degassed after treatment in the ladle metallurgy facility. This is a costly and time-consuming step. We have found that certain grades of steel for use in making seamless pipe, when produced by the Q-BOP process, can be sufficiently protected from hydrogen pick-up so as to permit elimination of the vacuum degassing step prior to ladle metallurgy treatment. Furthermore, we have found that by control of the composition of the aggregate the amount of flaring and flaming in the ladle due to decomposition of the dolomitic limestone can be reduced so as to eliminate burning and problems in the baghouse for dust collection of air in the ladle metallurgy facility while still retaining the benefit of eliminating vacuum degassing. This latter benefit is achieved by limiting the aggregate to the preferred composition of from about 15% to about 25% dolomitic limestone, from about 35% to about 65% calcium aluminate and from about 20% to about 40% burned lime.

We have successfully used the practice of the invention on line pipe steel having a typical composition of: C 0.25%, Mn 1.00%, Si 0.25%, Mo 0.25% and Al(Total) 0.035%. However, the invention is equally applicable to plain carbon and higher alloy pipe grades and other grades of steel for various other applications. We measure the hydrogen level of the steel by the Hydris method which gives reliable results. A typical example for use of the invention would be as follows:

Example

Refine 200 tons of molten steel in a Q-BOP converter so as to achieve a turndown carbon level of 0.022% and a temperature at turndown of 3035° F.

Avoid reblows of oxygen and late lime additions to the bath.

Purge the bath with nitrogen at a rate of 14,200 scfm for 60 seconds before tap.

Add ladle additions during tap of: 800 lbs. coke, 6250 lbs. of FeMn, 1400 lbs. FeSi, 420 lbs. FeMo and 350 lbs. Al bar.

Transfer the melt to the ladle metallurgy facility where an initial hydrogen reading by the Hydris method is obtained of H=5 ppm.

The synthetic slag cover of this invention is then added to the surface of the metal from a hopper in the ladle metallurgy facility. The hopper has 1500 lbs. of calcium aluminate at the lowest level, 500 lbs. of dolomitic limestone at an intermediate level, and 1000 lbs. of pebble lime on top of the other material. Alloy additions are added from another hopper to trim to final chemistry as follows: 275 lbs. Aluminium, 200 lbs. coke, 1250 lbs. FeMn, 490 lbs. FeSi and 150 lbs. FeMo.

A final Hydris test is taken to determine the hydrogen level with the result H=5.8.

The heat is then continuously cast without vacuum degassing to produce blooms for ultimate manufacture into seamless pipe.

We claim:

1. A method for providing steel with lowered hydrogen content after ladle treatment, said method comprising:
covering molten steel in the ladle with from about 5 to about 25 pounds of an aggregate of particulates per net ton of molten steel, said aggregate consisting essentially of from about 15% to about 65% dolomitic limestone, from about 35% to about 85% calcium aluminate and up to about 40% burned lime; and casting the molten steel into a solidified shape without vacuum degassing.

2. The method of claim 1 wherein the particulate material consists essentially of from about 15% to about 25% dolomitic limestone, from about 35% to about 65% calcium aluminate, and from about 20% to about 40% burned lime.

3. The method of claim 1 wherein said steel is a pipe steel composition for manufacture into pipe or tubular products.

* * * * *